FREQUENCY MULTIPLIER WITH PARALLEL FERRO-RESONANCE CIRCUITS

Filed April 20, 1965

3 Sheets-Sheet 1

INVENTORS
HIROSHI KOBAYASHI
SADAMU OHTERU
BY
Barnes, Kisselle, Raisch & Choate
ATTORNEYS Oct. 24, 1967 HIROSHI KOBAYASHI ET AL 3,349,317

FREQUENCY MULTIPLIER WITH PARALLEL FERRO-RESONANCE CIRCUITS

Filed April 20, 1965

3 Sheets-Sheet 2

INVENTOR.
HIROSHI KOBAYASHI
SADAMU OHTERU
BY
Barnes, Kisselle, Raisch & Choate
ATTORNEYS INVENTORS
HIROSHI KOBAYASHI
SADAMU OHTERU
BY
Barnes, Kisselle, Raisch & Choate
ATTORNEYS

3,349,317
FREQUENCY MULTIPLIER WITH PARALLEL FERRO-RESONANCE CIRCUITS

Hiroshi Kobayashi and Sadamu Ohteru, both of 1-647 Totsuka-machi, Shinjuku-ku, Tokyo, Japan Filed Apr. 20, 1965, Ser. No. 449,493
3 Claims. (Cl. 321—68)

This invention relates to a new type of frequency multiplier with a single phase power supply. One of the objects of the invention is to provide frequency multipliers to supply stable high-frequency output voltage with almost constant amplitude over the full range of load variation, which (the invention) eliminates such a disadvantage that the output voltage of the well known circuit with a single phase power supply varies or sometimes vanishes according to load variation.

Another object of the invention is to provide frequency multipliers to supply stable high-frequency output voltage with almost constant amplitude over a wider range of the voltages variation of a single phase power source, which eliminates such a disadvantage that the output voltage of the well known circuit with a single phase power supply varies or sometimes vanishes according to the variation of the single phase source voltage.

The behavior and the characteristics of the circuit embodying this invention are explained first, and compared with those of the basic and the well-known circuits embodying frequency multipliers with a single phase power supply, then the above objects and advantages of this invention will be clarified.

Figures 1, 2, 3, 4, 5, 6:
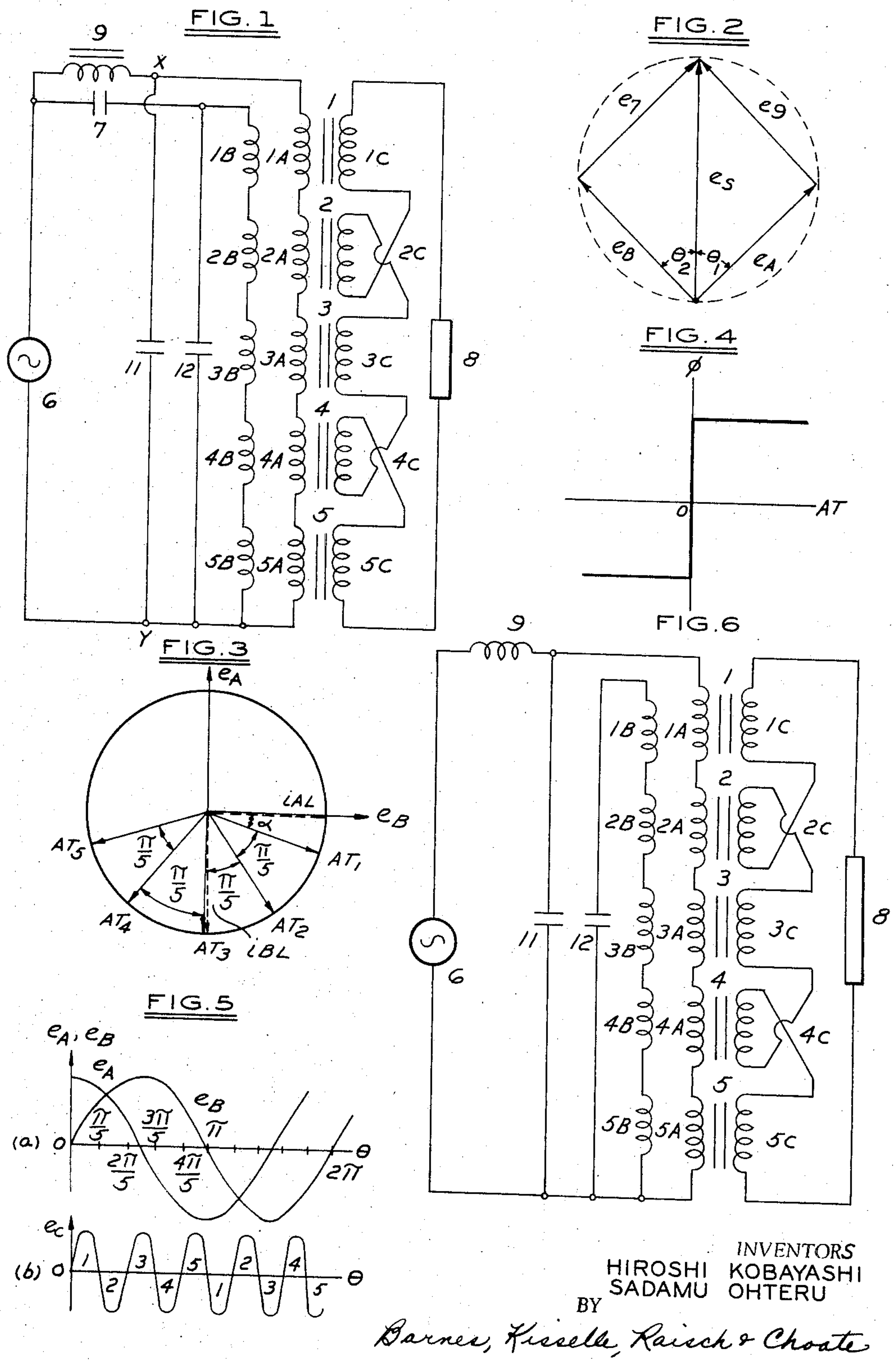
FIG. 1 is a circuit diagram of a frequency multiplier of the present invention.
FIGS. 2–5 are vector diagrams, magnetization characteristics and voltage waveforms for the circuit of FIG. 1.
FIG. 6 is a circuit diagram of a frequency multiplier modified slightly from that shown in FIG. 1 for purposes of understanding the operation and advantages of the present invention.
Figure 10:
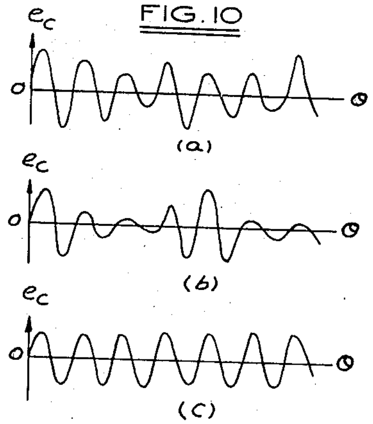
Figure 11:
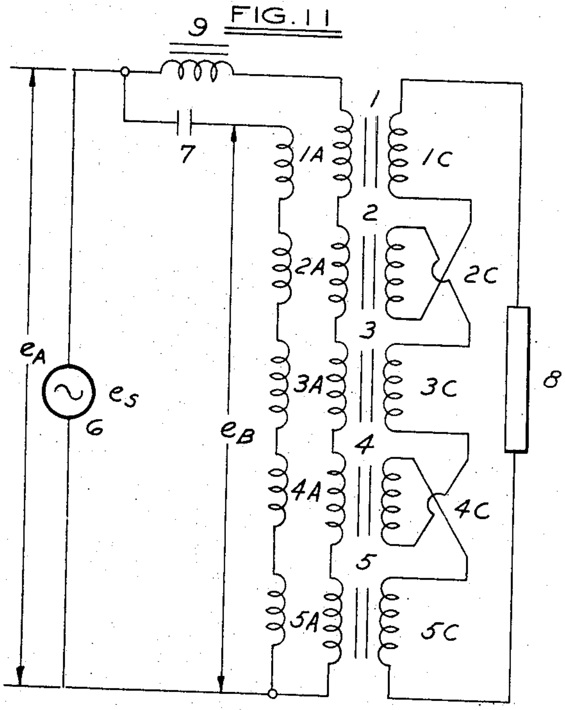
Figure 12:
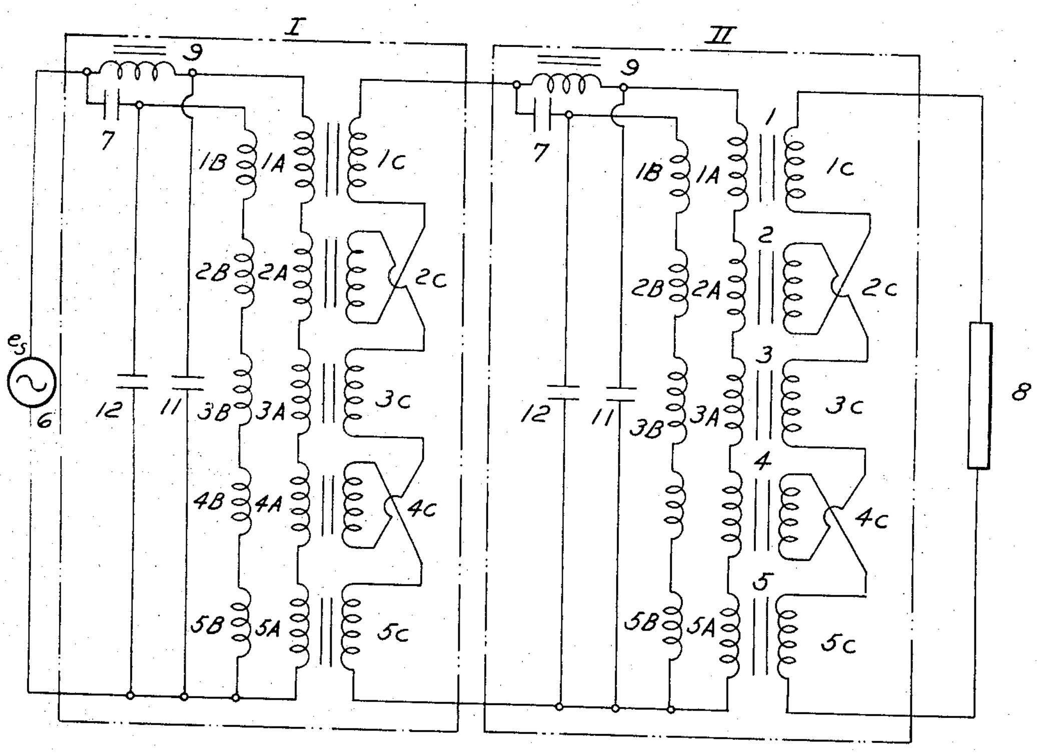
Figure 13:
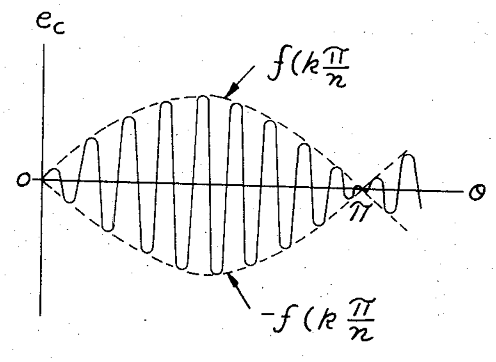

FIGS. 10*a–c* illustrate output voltage waveforms for the circuits of FIGS. 6, 11 and 1 respectively;

FIG. 11 is a circuit diagram of another frequency multiplier also modified slightly from that in FIG. 1 for purposes of understanding the operation and advantages of the present invention;

FIG. 12 is a circuit diagram of two frequency multipliers of FIG. 1 connected in cascade; and FIG. 13 is a diagram illustrating amplitude modulation that can be obtained by a further modification of the present invention.

FIGURE 1 shows, as an embodiment of this invention, the circuit of the frequency multiplier which multiplies the output frequency 5 times as high as the input frequency. The ferromagnetic cores 1, 2, 3, 4, and 5 have sufficiently large permeability before saturation and sufficiently small permeability (nearly zero) after saturation. The cores 1, 2, 3, 4, and 5 have three windings 1A, 1B, 1C; 2A, 2B, 2C; 3A, 3B, 3C; 4A, 4B, 4C; and 5A, 5B, 5C, respectively. $N_{kA}$, $N_{kB}$, and $N_{kC}$ are the number of turns of the windings $k$A, $k$B, and $k$C, respectively, and they are written in the form $$N_{kA}=N_o \cos \frac{\pi(k-1)}{n}+\alpha$$

$$N_{kB}=N_o \sin \frac{\pi(k-1)}{m}+\alpha$$

$$N_{kC}=N_c(-1)^{k-1} \quad (1)$$

where $k$ is a core number 1, 2, 3, 4, or 5, $n$ is the number of cores and $n=5$ in the circuit in FIG. 1, $\alpha$ is an arbitrary phase-angle and constant independent of $k$, and $N_o$, $N_c$ are constants independent of $k$. The minus sign in the right-hand side of Eq. 1 means the opposite polarity of the connection of winding. The windings 1A, 2A, 3A, 4A, and 5A are connected in series, the windings 1B, 2B, 3B, 4B, and 5B are connected in series, and the windings 1C, 2C, 3C, 4C, and 5C are connected in series. These connections are called the series-connected branch A, the series-connected branch B, and the series-connected branch C, respectively. The capacitor 11 is connected in parallel to the series-connected branch A to form a parallel ferroresonance circuit A. An alternating current voltage is supplied to this parallel ferroresonance circuit A from the single phase power source 6 through the linear reactor 9. The capacitor 12 is connected in parallel to the series-connected branch B to form a parallel ferroresonance circuit B. An alternating current voltage is supplied from the single phase power source 6 to this parallel ferroresonance circuit B through the capacitor 7. The above connections enable the circuit to supply to the load 8 an alternating current output voltage with the frequency 5 times as high as that of the source voltage.

The following is the explanation of the behavior of the circuit concerning the fundamental frequency. The current flowing in the series-connected branch A is composed of the wattless current $i_{AL}$ exciting the cores and the watt current $i_{AR}$. If the amplitude of the fundamental component of the wattless current $i_{AL}$ flowing in the series-connected branch A is equal to that of the current $i_{AC}$ flowing in the capacitor 11, then the relation $$i_{AL}+i_{AC}=0 \quad (2)$$

is satisfied, and the current flowing in the linear reactor 9 is just equal to the current $i_{AR}$. The current $i_{AR}$ is in phase with the voltage $e_A$ applied to the parallel ferroresonance circuit A. Thus the voltage $e_A$ differs from the voltage $e_g$ across the linear reactor 9 in phase by $\pi/2$ radians. Accordingly, the relation among the source voltage $e_s$, $e_g$, and $e_A$ can be shown by the reactor diagram of the right side of FIG. 2. In the same manner, if the amplitude of the fundamental component of the wattless current (exciting the cores) flowing in the series-connected branch B is equal to that of the current $i_{BC}$ flowing in the capacitor 12, the relation $$i_{BL}+i_{BC}=0 \quad (3)$$

is satisfied, and the current flowing in the capacitor 7 is just equal to the watt current $i_{BR}$. The current $i_{BR}$ is in phase with the voltage $e_B$ applied to the parallel ferroresonance circuit B. Thus the voltage $e_B$ differs from the voltage $e_7$ across the capacitor 7 in phase by $\pi/2$ radians. Accordingly, the relation among $e_S$, $e_7$, and $e_B$ can be shown by the vector diagram of the left side of FIG. 2.

As mentioned above, two reactive currents in the parallel ferroresonance circuit A cancel each other, and two reactive currents in the parallel ferroresonance circuit B cancel each other. Therefore, the voltage $e_A$ lags in phase by $\theta_1$ behind the voltage $e_S$, and the voltage $e_B$ leads in phase by $\theta_2$ referred to the voltage $e_S$. Consequently, an adequate selection of the impedance values of the linear reactor 9 and the capacitor 7 makes $\theta_1$ and $\theta_2$ equal to $\pi/4$ radians. Thus the phase-difference between $e_A$ and $e_B$ is made equal to $\pi/2$ radians. The exciting ampere-turn $AT_k$ applied to the core $k$ is $$AT_{kA}=i_{AL}\cdot N_{kA}+i_{BL}\cdot N_{kB} \quad (4)$$

where $N_{kA}$ and $N_{kB}$ are defined in Eq. 1, and the ampere-turn of the series-connected branch C is neglected. If $e_A$ and $e_B$ have the phase-difference by $\pi/2$ radians, the wattless currents $i_{AL}$ and $i_{BL}$ in the series-connected branches A and B lag in phase by $\pi/2$ radians behind $e_A$ and $e_B$, respectively. Thus $AT_k$ can be shown by the vector diagram of FIG. 3. Taking 1, 2, 3, 4, and 5 for $k$ gives the phase-shift of $\pi/5$ radians to $AT_1$, $AT_2$, $AT_3$, $AT_4$, and $AT_5$ in order. If the magnetization characteristics of the cores 1, 2, 3, 4, and 5 are rectangular as shown in FIG. 4, a counter electromotive force is induced only to the windings of an unsaturated one of the cores 1, 2, 3, 4, and 5. If the core $k$ is unsaturated, the voltages $e_A$ and $e_B$ are applied to the windings $k$A and $k$B, which transmit the voltage $e_c$ to the side of the series-connected branch C. Namley, if phase angle $\alpha$ in Eq. 1 is set to be near $\pi/10$ radians for example, the core 1 is made unsaturated at the interval $$0<\theta<\frac{\pi}{5}$$

including the half wave voltage 1 to the winding 1C as shown in FIG. 5*b*. At this time, the other cores are saturated never to induce any voltage. The core 2 is made unsaturated at the interval $$\frac{\pi}{5}<\theta<\frac{2\pi}{5}$$

inducing the voltage 2 to the winding 2C as shown in FIG. 5*b*. It is because the polarity of the winding 2C is opposite to that of the winding 1C that the polarity of the voltage 2 is opposite to that of the voltage 1. In this way, any one of the cores 1, 2, 3, 4, and 5 induces voltage in rotation to the side of the series-connected branch C. Thus the voltage $e$ with the frequency five times as high as that of the source voltage is supplied to the load 8. Although the power source of the circuit is a single-phase, the behavior of the circuit is just the same as that of the circuit with a two-phase power source.

In this invention, the capacitor 11 is connected in parallel to the series-connected branch A. As an alternating current source voltage is supplied to the parallel ferroresonance circuit consisted of the capacitor 11 and the series-connected branch A, this circuit forms a parallel-ferroresonance-type voltage stabilizer with the linear reactor 9. Therefore, the voltage across the terminals X and Y in FIG. 1 is kept almost constant for the voltage variation of the source 6. In the circuit in FIG. 6, where the capacitor 7 in the circuit in FIG. 1 is taken off, it is observed in experiments that the voltage $e_A$ across the series-connected branch A induces to the series-connected branch B the alternating current voltage $e_B$ differing from $e_A$ in phase by $\pi/2$ radians and having almost the same amplitude as that of $e_A$ (FIG. 5*a*). The following is the consideration of the above phenomenon, from which the objects and the advantages of this invention are made apparent. As the analysis of the phenomenon is quite difficult, a qualitative explanation is given and experimental results of the phenomenon are added.

Figure 7:
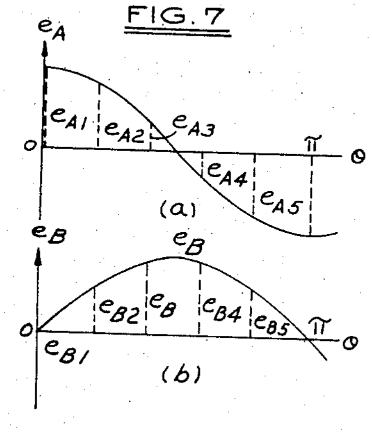
FIGS. 7 and 8 are voltage waveforms and voltage diagrams for the circuit of FIG. 6.
Figure 8:
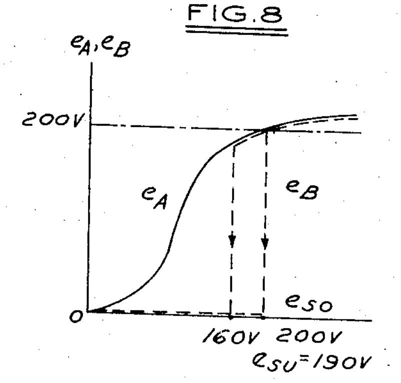

Suppose that in any way such an alternating current voltage is applied to the series-connected branch B that lags in phase by $\pi/2$ radians behind the voltage $e_A$ across the series-connected branch A. Then, as mentioned before, the exciting ampere-turns $AT_1$, $AT_2$, $AT_3$, $AT_4$, and $AT_5$ differ from one another in phase by $\pi/5$ radians. Under these circumstances, the voltage transmitted from the windings A to the windings B is written as $$e_{Bk}=e_{Ak}\frac{N_{kB}}{N_{kA}} \qquad (5)$$

where $e_{Ak}$ and $e_{Bk}$ are the electromotive forces across the windings A and B in the case when the core $k$ is unsaturated. As an example, FIG. 7*a* and *b* show values $e_{Ak}$ and $e_{Bk}$ for $k=1, 2, 3, 4$, and 5, and $a=0$. From FIG. 7 it is known that the alternating current voltage $e_B$ induced to the series-connected branch B lags in phase by $\pi/2$ radians behind $e_A$. The induced voltage $e_B$ charges the capacitor 12 and the charged current flows back into the series-connected branch B to excite the magnetic cores together with the current flowing in the series-connected branch A. By these two currents, as described before, the cores 1, 2, 3, 4, and 5 are excited in rotation differing in phase by $\pi/5$ radians, which maintains the above mentioned voltage-induction from the windings A to the windings B. In consequence, it is found that once the $\pi/2$-radian-lagged voltage $e_B$ is induced by the voltage $e_A$ to the parallel resonance oscillating tank consisted of the series-connected branch B and the capacitor 12, parallel oscillating tank is energized continuously to maintain this operation. The above explanation gives no consideration to the establishment of the voltage $e_B$, though, FIG. 8 shows an experimental result on the generation of $e_B$ in the circuit in FIG. 6. There the abscissa represents the voltage $e_S$ of the power source 6 and the ordinate represents the voltage $e_A$ for the solid curve and the voltage $e_B$ for the dotted curve. As shown in FIG. 8, the voltage $e_{SU}$ needed to generate $e_B$ is considerably high and close to the rated voltage (equal to the resonance voltage) $e_{SO}$. The closer to the ideal rectangle the magnetization characteristics of the cores are, the closer to the rated voltage $e_{SO}$ the voltage $e_{SU}$ comes. Accordingly, a slight dropping of the source voltage might cause the vanishment of the voltage $e_B$ and the circuit might lose the frequency-multiplying function.

Figure 9:
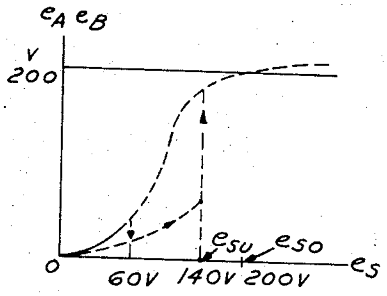
FIG. 9 is a voltage diagram for the circuit of FIG. 1 corresponding to the voltage diagram of FIG. 8.

One of the objects of this invention is to eliminate the above disadvantage and to provide frequency multipliers which operate stably over a wider range of the variation of the source voltage. In the circuit of this invention, as mentioned before, the linear reactor 9 acts not only as a compensating element which compensates the voltage across the parallel ferroresonance oscillating tank A, but also as a phase shifting element which serves together with the capacitor 7 to supply voltages differing from each other in phase by $\pi/2$ radians to the parallel ferroresonance oscillating tanks A and B. Therefore, the circuit of this invention generates $e_B$ at $e_{SU}$ considerably smaller than the rated voltage $e_{SO}$ as shown in FIG. 9, and overcomes the disadvantage in the circuit in FIG. 6. Moreover, in the circuit in FIG. 6, it is observed in experiments that the amplitude of the output voltage gets modulated at the frequency of the source voltage with the increase of load current as shown in FIG. 10*a*. Since the power supply is given from the source to the parallel ferroresonance oscillating tank A and from the parallel ferroresonance oscillating tank A to the parallel ferroresonance oscillating tank B, the voltage induced to the parallel forreoresonance oscillating tank B is decreased with the increase of the load. Therefore, the current $i_{BL}$ flowing in the series-connected branch B is made smaller than the current $i_{AL}$ flowing in the series-connected branch A. Consequently, the exciting ampere-turn $AT_k$ is decreased or increased dependent upon $k$, and the modulated output waveform mentioned above is observed. In the circuit of this invention, the power is supplied to the parallel ferroresonance oscillating tank B not only from the series-connected branch A but also through the capacitor 7. Therefore, $e_B$ becomes little smaller than $e_A$ in spite of the increase of the load. In this way, the circuit supplies a high-frequency output voltage with almost constant amplitude.

It may be questionable that $e_A$ and $e_B$ in the vector diagram of FIG. 2 may become smaller than $e_8$ and $e_7$, and the phase-difference between $e_A$ and $e_B$ may deviate from $\pi/2$ radians as the load resistance in FIG. 1 decreases. However, it should be noted that the linear reactor 9 and the parallel ferroresonance oscillating tank A form a parallel ferroresonance circuit to keep the voltage $e_A$ almost constant, and the voltage-induction from the series-connected branch A to the series-connected branch B and the voltage-supply through the capacitor 7 to the series-connected branch B both keep the voltage $e_B$ almost constant. Thus the phase-difference between $e_A$ and $e_B$ is almost kept to $\pi/2$ radians.

Moreover, in the well-known circuit which has only the phase shifting elements, FIG. 11 (the linear reactor 9 and the capacitor 7), when the circuit is loaded the waveform of the output voltage is distorted as shown in FIG. 10b. As the phase-differences between $e_A$ and $e_S$, and $e_B$ and $e_S$ vary according to the variation of the load resistance, the phase-difference between two ampere-turns of two adjacent cores deviates from $\pi/5$ radians, and the amplitudes of the ampere-turns differ from one another dependent upon the core number $k$. Therefore, the amplitude and frequency of the output voltage are modulated partially dependent upon the core number $k$. Furthermore, the high-frequency output voltage in FIG. 11 varies according to the variation of the source voltage, since $e_A$ and $e_B$ vary according to the variation of the source voltage. These disadvantages are eliminated in the circuit of this invention as mentioned before.

In addition, the advantage of this invention presents itself when higher degree of multiplication is required. If, for example, two sets of frequency multipliers are connected in cascade as shown in FIG. 12, the output voltage of the first stage often differs from the rated input voltage of the second stage because of various differences in manufacturing processes. However, the difference between the output voltage of the first stage and the rated input voltage of the second stage causes no trouble, the two-stage-cascade-connected circuit operates stably owing to the automatic voltage regulating action in the input side of the second stage. Besides, although the output voltage of the first stage is a single phase, the second stage can be excited stably by two-phase voltage without any help of auxiliary devices. The excellent feature of this invention in multistage cascade connection is readily apparent from the fact that the output of the frequency multipliers of this type is always a single phase.

In addition, this invention overcomes another disadvantage in the well-known circuits. That is, if the well-known circuits are connected in cascade, a slight variation of the input voltage may be accumulated step by step and give a large variation to the output voltage of the last stage, thus the multistage cascade connection of the well-known circuits cannot be put to practical use. On the contrary, in the circuit of this invention, as the output voltage is kept almost constant over a considerably wide range of the variation of the source voltage, the cascade connection can be put to practical use.

In the circuit of this invention, the phase shifting elements are the linear reactor 9 and the capacitor 7, and two reactive currents flowing in them almost cancel each other. The lagging currents flowing in the series-connected branches A and B are cancelled by the leading currents flowing in the capacitors 11 and 12, respectively. Thus, only a small reactive current is included in the input current and the power factor in the circuit is maintained at a high value (near unity) for the rated input voltage. This is also advantageous to multistage cascade connection, since, when a load of the first stage has a lagging power factor, the impedance of the circuit produces a large voltage drop which disturbs the operation of the second stage.

Although the circuit embodying this invention shown in FIG. 1 has five magnetic cores and the degree of multiplication is five, it is clear that in general this invention provides a circuit with $n$ cores having a degree of multiplication of arbitrary odd number $n$.

The advantages of this invention are realized by the following techniques, $n$ cores with rectangular characteristics of magnetization are used, each of the $n$ cores has two exciting windings, the number of turns of which is so selected that the resultant magnetomotive forces in successive cores have the same amplitude but the phase-difference of $\pi/n$ radians in rotation; a third winding with same number of turns is wound on each of $n$ cores and connected in series with alternative polarity one by one so that the voltage with the frequency $n$ times as high as that of the source voltage is induced in the said series-connected branch of the third windings by the flux change in successive cores which has the phase-difference of $\pi/n$ radians; in order to supply a two-phase voltage for the series-connected branches A and B from a single phase power source 6, the series-connected branch A is connected to the single phase power source 6 through a linear reactor 9 in series, and the series-connected branch B is connected to the said power source 6 through a capacitor 7 in series; in order to keep the phase difference between the said A and B phase voltages to $\pi/2$ radians and to keep their amplitude substantially constant, a phase leading network through which a leading current flows is connected in parallel with each of the said series-connected branches A and B, and thus the quasi-two-phase supply split from a single phase power supply by the said phase shifting elements is stabilized in its voltage and phase by (1) the voltage stabilization effect by ferroresonance and (2) the pull-in-effect of phase and amplitude by the interference of nonlinear oscillation in two ferroresonant parallel tank circuits.

In this way, multistage cascade connection could be realized and $n$ times multiplied frequency power could be obtained easily. The advantages of this invention are as follows: frequency multiplication of arbitrary odd degree can be obtained from a single phase power supply with ease, large degree of multiplication is obtainable by multistage cascade connection, and stable operation for the wide range of variation of source voltage and load and high efficiency are also obtainable.

In addition to these mentioned above, another interesting embodiment of this invention is given by the use of the fact that the induced voltage of the third winding of each core is in proportion to its number of turns. By selecting the number of turns of said third windings on successive cores to a certain desired function of core number, $$N_{kC}=N_C\cdot(-1)^{k-1}\cdot f\left(k\frac{\pi}{n}\right) \quad (6)$$

instead of Equation 1, we can obtain the voltage with $n$ times multiplied frequency whose amplitude is modulated by the said function $$f\left(k\frac{\pi}{n}\right)$$

without using any electronic devices. In FIG. 13, the case of $$f\left(k\frac{\pi}{n}\right)=\sin\left(k\frac{\pi}{n}\right) \quad (7)$$

is shown as an example.

The function $$f\left(k\frac{\pi}{n}\right)$$

can be selected in arbitrary form only by the number of turns of third windings and moreover the amplitude modulated waveform of output voltage is remarkably stable in spite of the variation of input voltage and load. These are the prominent additional features of this invention.

What we claim is:

1. A frequency multiplier having a single phase alternating current source of predetermined frequency wherein: two exciting windings are wound in pairs on each of $n$ cores with each winding having a number of turns on each core selected so that the resultant magnetomotive forces made by the currents flowing in said two exciting windings in successive ferromagnetic cores have the same amplitude but are $\pi/n$ radians apart where $n$ is the degree of multiplication; each of said two windings having its turns on successive cores connected in series to form respective series-connected branches; each of two capacitors is connected in parallel with each of said series-connected branches forming an oscillating tank respectively; one of the source terminals is connected to one of the junctions of one of said series-connected branches and one of said capacitors through a linear reactor in series, and is also connected to one of the junctions of the other said series-connected branch and the other said capacitor through a capacitor in series; the other source terminal is connected to the other common joint of both series-connected branches and capacitors; a third winding is wound with turns on each of said $n$ cores connected in series with alternative polarity one by one; and from said series-connected branch of third windings the voltage with $n$ times multiplied frequency can be supplied to a load.

2. A frequency multiplier having a single phase alternating current source of predetermined frequency, wherein: two exciting windings are wound in pairs on each of $n$ cores with each winding having a number of turns on each core selected so that the resultant magnetomotive forces made by the currents flowing in said two exciting windings in successive ferromagnetic cores have the same amplitude but are $\pi/n$ radians apart where $n$ is the degree of multiplication; each of said two windings havings its turns on successive cores connected in series to form respective series-connected branches; each of two capacitors is connected in parallel with each of said series-connected branches forming an oscillating tank respectively; one of the source terminals is connected to one of the joints of one of said series-connected branches and one of said capacitors through a linear reactor in series, and is also connected to one of the joints of the other said series-connected branch and the other said capacitor through a capacitor in series; the other source terminal is connected to the other common joint of both series-connected branches and capacitors; a third winding with the same number of turns is wound on each of said $n$ cores and connected in series with alternative polarity one by one; and from said series-connected branch of third windings the voltage with $n$ times multipled frequency can be supplied to load.

3. A frequency multiplier having a single phase alternating current source of predetermined frequency, wherein: two exciting windings are wound in pairs on each of $n$ cores with each winding having a number of turns on each core selected so that the resultant magnetomotive forces made by the currents flowing in said two exciting windings in successive ferromagnetic cores have the same amplitude but are $\pi/n$ radians apart where $n$ is the degree of multiplication; each of said two windings having its turns on successive cores connected in series to form respective series-connected branches; each of two capacitors is connected in parallel with each of said series-connected branches forming an oscillating tank respectively; one of the source terminals is connected to one of the joints of one of said series-connected branches and one of said capacitors through a linear reactor in series, and is also connected to one of the joints of the other said series-connected branch and the other said capacitor through a capacitor in series; the other source terminal is connected to the other common joint of both series-connected branches and capacitors; a third winding is wound with turns on each of said $n$ cores connected in series with alternative polarity one by one; the number of said third winding on successive cores is in proportion to a function $$f\left(k\frac{\pi}{n}\right)$$

where $k$ is the core number; and from said series-connected branch of third windings the voltage with $n$ times multiplied frequency whose amplitude is modulated by the said function $$f\left(k\frac{\pi}{n}\right)$$

can be supplied to load.

References Cited

UNITED STATES PATENTS

| | | | |
|---|---|---|---|
| 2,274,925 | 3/1942 | Huge | 321—68 |
| 3,229,192 | 1/1966 | Bundy | 321—68 |

JOHN F. COUCH, *Primary Examiner.*

G. GOLDBERG, *Assistant Examiner.*